(12) United States Patent
Heidenreich et al.

(10) Patent No.: US 8,909,788 B2
(45) Date of Patent: Dec. 9, 2014

(54) METHOD AND SYSTEM FOR USING TEMPORARY EXCLUSIVE BLOCKS FOR PARALLEL ACCESSES TO OPERATING MEANS

(75) Inventors: Georg Heidenreich, Erlangen (DE); Marta Jaremek, Nürnberg (DE); Wolfgang Leetz, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 59 days.

(21) Appl. No.: 13/496,782

(22) PCT Filed: Sep. 10, 2010

(86) PCT No.: PCT/EP2010/063324
§ 371 (c)(1),
(2), (4) Date: Mar. 16, 2012

(87) PCT Pub. No.: WO2011/032895
PCT Pub. Date: Mar. 24, 2011

(65) Prior Publication Data
US 2012/0179821 A1    Jul. 12, 2012

(30) Foreign Application Priority Data
Sep. 18, 2009    (DE) .......................... 10 2009 042 128

(51) Int. Cl.
*G06F 15/173*    (2006.01)
*G06F 9/52*    (2006.01)

(52) U.S. Cl.
CPC ...................................... *G06F 9/526* (2013.01)
USPC .......................................... 709/226; 709/225

(58) Field of Classification Search
USPC ................. 709/201–203, 208–211, 217–219; 707/705, 781, 785; 710/36, 40, 41, 45, 710/200; 711/100, 167, 168
See application file for complete search history.

(56) References Cited

U.S. PATENT DOCUMENTS

| | | | | |
|---|---|---|---|---|
| 5,226,143 A | * | 7/1993 | Baird et al. | 711/145 |
| 5,892,954 A | * | 4/1999 | Tomas et al. | 710/200 |

(Continued)

FOREIGN PATENT DOCUMENTS

| | | |
|---|---|---|
| KR | 1999-006454 | 1/1999 |
| KR | 2000-0039196 | 7/2000 |

OTHER PUBLICATIONS

FLEXlmTM End Users Guide, Version 9.2, Jul. 2003, Macrovision Corp. , USA, pp. 77-83 <http://www.eyeonline.com/Downloads/floatlicense/macrovision-enduser.pdf> (recherechiert am 14.11.05); Others.

(Continued)

*Primary Examiner* — Hassan Kizou
*Assistant Examiner* — Phyllis Book
(74) *Attorney, Agent, or Firm* — Harness, Dickey & Pierce, P.L.C.

(57) ABSTRACT

In at least one example embodiment, the invention relates to a computer-implemented method, a computer-implemented system and a computer program product for controlling the access to splittable resources in a distributed client server system operating in parallel. The resource control system is designed for a plurality of clients connected to the system and is used to maintain consistency of the data. When a client makes a first attempt to access a resource of the server, an exclusive lock for the requested resource is allocated to the accessing client, that blocks the access to the resource for other clients, said exclusive lock only being allocated for a pre-determinable period of time and then automatically discontinued.

10 Claims, 3 Drawing Sheets

(56) References Cited

U.S. PATENT DOCUMENTS

| | | | |
|---|---|---|---|
| 6,226,717 B1* | 5/2001 | Reuter et al. | 711/147 |
| 6,301,616 B1* | 10/2001 | Pal et al. | 709/226 |
| 6,598,079 B1* | 7/2003 | Pal et al. | 709/226 |
| 6,775,703 B1 | 8/2004 | Burns | |
| 7,529,844 B2* | 5/2009 | Radovic et al. | 709/229 |
| 7,856,536 B2* | 12/2010 | Bergheaud et al. | 711/150 |
| 8,126,843 B2* | 2/2012 | McKenney et al. | 707/610 |
| 8,140,622 B2* | 3/2012 | Curran et al. | 709/205 |
| 8,260,913 B2* | 9/2012 | Knapp et al. | 709/224 |
| 8,332,485 B1* | 12/2012 | Ben-Shaul et al. | 709/219 |
| 8,352,658 B2* | 1/2013 | Tarta et al. | 710/200 |
| 8,370,318 B2* | 2/2013 | Chan et al. | 707/704 |
| 8,452,743 B2* | 5/2013 | Vasudevan et al. | 707/704 |
| 8,489,636 B2* | 7/2013 | Scales et al. | 707/781 |
| 8,495,311 B2* | 7/2013 | Martin | 711/155 |
| 2003/0041225 A1* | 2/2003 | Mattina et al. | 712/30 |
| 2003/0093457 A1* | 5/2003 | Goldick | 709/104 |
| 2003/0217241 A1 | 11/2003 | Chong | |
| 2005/0235289 A1* | 10/2005 | Barillari et al. | 718/100 |
| 2006/0136637 A1* | 6/2006 | Goldick | 710/200 |
| 2007/0226320 A1* | 9/2007 | Hager et al. | 709/219 |
| 2009/0006627 A1* | 1/2009 | Castellucci et al. | 709/226 |
| 2011/0055912 A1* | 3/2011 | Fusari et al. | 726/8 |

OTHER PUBLICATIONS

Irwin D et al: "Sharing Networked Resources with Brokered Leases", Proceedings of the 2006 USenix Annual Technical Conference, May 30-Jun. 3, 2006, Bosten, MA, USA, Usenix Association, Berkeley, CA, USA, May 30, 2006, Seiten 199-212, XP001556112; Others; 2006.

Bouchat Ret al: "Asynchronous leasing", Object-Oriented Real-Time Dependable Systems, 2002 (WORDS 2002), Proceedings of the Seventh International Workshop, Aug. 7, 2002, Aug. 9, 2002, Seite 180-187, XP002619912, San Diego, CA, USA, DOI: 10.1109/WORDS.2002.1000051, ISBN: 0-7695-1576-2, gefunden im Internet: URL: http://ieexplore.ieee.org/xpls/abs_all.jsp?arnumber=1000051, gefunden am Jan. 12, 2011; Others; 2002.

International Search Report.

German Office Action for German Application No. DE 10-2009 042 128.9 (Not Yet Published).

German Priority Document for German Application No. DE 10-2009 042 128.9 (Not Yet Published).

Jul. 23, 2013 Notice of Preliminary Rejection received in corresponding KR 10-2012-7007054 (with translation).

* cited by examiner

METHOD AND SYSTEM FOR USING TEMPORARY EXCLUSIVE BLOCKS FOR PARALLEL ACCESSES TO OPERATING MEANS

PRIORITY STATEMENT

This application is the national phase under 35 U.S.C. §371 of PCT International Application No. PCT/EP2010/063324 which has an International filing date of Sep. 10, 2010, which designated the United States of America, and which claims priority to German patent application number DE 10 2009 042 128.9 filed Sep. 18, 2009, the entire contents of each of which are hereby incorporated herein by reference.

FIELD

At least one embodiment of the present invention generally lies in the field of information technology and at least one embodiment relates in particular to the control of accesses to sharable resources in a distributed computer-based system. A principal field of application may be medical engineering, e.g. the control of magnetic resonance tomography apparatus, computed tomography systems or other medical engineering installations or peripheral devices, such as printers, memories/storage media, special hardware units or the like. At least one embodiment of the invention resides at operating system level and generally relates to the control of accesses to resources. The accesses may be what are referred to as contending accesses, whereby in the event that a corresponding access control function fails a state known as deadlock occurs, resulting overall in an error, and for that reason needs to be ruled out.

BACKGROUND

An operating device can include hardware components and/or software components which in principle can also be used simultaneously by different computer-based units or clients.

If, for example, data is modified in the course of the access (e.g. by way of a WRITE access), it is important to ensure that the data is kept consistent.

It is known in the prior art to set what are called exclusive locks in order to ensure data consistency during contending accesses to operating device/module. The exclusive locks are managed by way of a central server which usually also controls storage of and access to the resources. Within this scheme, if a client wishes to access a resource, it is mandatory that it receives an exclusive lock in order thereupon to be able to access the resource (e.g. for writing).

By allocating the exclusive lock it is ensured that only the requesting client can access the operating device/module, thereby preventing the possibility of inconsistent data records being generated if another client were to want to access the same resource simultaneously or in an overlapping time interval. A write access to data records of a memory resource serves as a typical example of an access to a resource.

Normally it is ensured that only one exclusive lock may be allocated per resource at a given time instant to one client exclusively. Since a read access by definition does not modify the data, multiple concurrent accesses may be permitted without an exclusive lock having to be allocated each time.

Depending on operating system or implementation it may however be that a read access is likewise allocated a lock, albeit not an exclusive lock, but a non-exclusive lock. The system of allocating locks in order to ensure consistent data storage and management is implemented so that concurrent accesses are serialized according to a strict sequentialization scheme.

A fundamental disadvantage of systems from the prior art that operate with the allocation of exclusive locks is, however, to be seen in the fact that they oblige significant performance penalties to be accepted, since the requesting clients basically have to wait for the exclusive locks to be allocated or released. Furthermore it may happen that exclusive locks are "lost" because an exclusive lock is not released due to errors elsewhere. Nonetheless, the concept of exclusive locks is an extensively used operating system device/module for controlling accesses to data records (such as e.g. text documents or the like), countable resources (such as e.g. memory space, input/output channels, etc.) or other resources that are managed on a computerized basis (such as e.g. hotel bookings, car rentals, flight reservations or production facilities of logistical units, etc.).

Two strategies in particular are employed for this in the prior art:

1.—"Many Early Locks":

This strategy entails an approach whereby an exclusive lock is already set at a very early stage and in all those situations in which there is basically the possibility that data records will be modified. With this approach an exclusive lock is usually set regardless of the type of access (e.g. read access, write access, execute access, etc.) to the data records. The disadvantage of this approach is to be seen in the fact that a client potentially has to wait a very long time before it receives a non-critical read access to the contents of requested data records. Accordingly, with this approach, more importance is attached to maintaining the consistency of the data than on processing speed.

2.—"Lock Little, Lock Late":

With this strategy it is attempted to set exclusive locks as little as possible and as late as possible. Normally an exclusive lock is set on a data record that is being processed by a client only when the client also actually wishes to modify the contents of the data record. The disadvantage of this approach is that another client simply wanting to perform a read access to the data will possibly see an out-of-date (inconsistent) data record for which, namely, another client in parallel possesses an exclusive lock for modifying the respective data. This approach favors the speed aspect above the consistency aspect.

In critical systems (e.g. traffic control systems in which maintaining the consistency of the data plays a particularly important role) the former of the two above-cited strategies ("many early locks") is more often chosen on safety grounds alone. In non-critical applications and when asynchronous protocols such as e.g. the internet are used, the second "lock little—lock late" strategy is employed more often in order to be able to provide a system delivering the highest possible performance.

SUMMARY

At least one embodiment of the present invention is directed toward disclosing a possible way in which access control to sharable resources in a computer-based system can be improved in order to maintain the consistency of the data specifically when asynchronous protocols are used.

A computer-implemented method is disclosed, along with an access control system and a computer program product.

A computer-implemented method is disclosed in at least one embodiment. Features, advantages or alternative embodiment variants mentioned in this connection are also to be applied equally to the system and the computer program product. In this case the functional features of the method are embodied by way of corresponding objective modules, in particular by hardware modules.

An essential basic concept of at least one embodiment of the present invention is to develop and improve further the aforementioned strategies for maintaining data consistency, as known in the prior art, for the use of asynchronous protocols. In this case an exclusive lock is to be allocated subject to certain conditions. According to one aspect of at least one embodiment, a condition entails a time aspect, such that an allocated exclusive lock will expire again automatically after a predetermined time interval has elapsed. Alternative embodiment variants of the invention provide other expiration conditions here which are e.g. event-dependent, access-dependent or access-type-dependent, or client-dependent.

A particular advantage of the solution according to of at least one embodiment the invention is to be seen in the fact that it is specifically tailored to asynchronous protocols in which no "END" or "ABORT" is provided as part of the protocol, but in which multiple asynchronous connections can basically be activated or be in use in parallel. In the asynchronous protocols—in contradistinction to the synchronous ones—no tight coupling of the communication partners is provided.

According to one aspect of at least one embodiment of the invention, a computer-implemented method is disclosed for controlling accesses or attempted accesses to sharable resources in a distributed client-server system in parallel operation, wherein the control function is performed centrally for a plurality of clients connected to the system and comprises the following method for maintaining the consistency of the data:

registering an access or an attempted access by an accessing client to a resource; and allocating an exclusive lock for the resource to the accessing client, wherein the exclusive lock blocks accesses by other clients to this (the same) resource, wherein the exclusive lock is allocated for a predeterminable time interval and then expires automatically.

According to an aspect of at least one embodiment of the invention, the exclusive lock is therefore allocated for a specific time interval only. After the predeterminable time interval has elapsed, the resource is automatically released again so that it also becomes available to other requesting clients. In this way it is possible to prevent locks that have once been allocated in the system from "getting lost" due to errors elsewhere.

According to at least one embodiment of the invention, a client's accesses to a resource are registered. According to one aspect of at least one embodiment of the invention, actual accesses, such as e.g. a write, read, EXE access, are registered. According to another aspect of at least one embodiment of the invention, not just the direct accesses are registered, but in addition even attempted accesses. By this is to be understood requests or jobs that are issued by applications and/or clients and normally passed on by way of the operating system to the requested resource for execution. In an access attempt the access has not yet been executed directly or immediately, but is planned.

The resources are external or internal operating devices/modules of a computer-based system. Usually they are data storage media/memories and the access is a data processing access (e.g. WRITE, EXE, LIST, QUERY).

Alternatively, however, other computer-based resources can also be included therein, such as electronic objects and/or communication devices (such as ports, communication channels, network access points, etc.) as well as electronic representations of logical and/or physical resources. By the last alternative are to be understood for example electronic representations of external logical or physical resources, such as, say, hotel rooms, sections of track, seats in an aircraft, etc. The corresponding access then takes place typically within the context of a booking (e.g. of a hotel room or of a seat on an airplane, etc.). The resources can in principle be hardware and/or software components which can be used exclusively and simultaneously. Furthermore, the resources can basically be revocable (preemptive/interruptible) or irrevocable (non-preemptive).

Within the context of embodiments of the invention, the concept of a "distributed client-server system" is to be understood to mean a computer-based system in which independent computer-based instances are integrated by way of a network. The computer-based instances can be standalone computers and processes and/or processors of a computer. The system is essentially based on the client-server concept, in which a computer-based client can request the execution of a task by the computer-based server. The solution according to at least one embodiment of the invention can, however, also be applied to systems other than conventional client-server systems, in which a central instance assumes the role/functionality of the server. Accordingly, a client can be an arbitrary information technology system that wishes to access resources of the client-server system. In this case a client can have a split functionality. A client can also take on the role of the server for other functions and/or data, while another part maps the client functionality. This also applies analogously to the server, such that according to a main aspect a server processes the requests of the clients and according to a further aspect it can for its part likewise act as a client again. Usually a central instance is provided which is connected to the client-server system as a separate control instance or which is implemented in the server and acts as a management instance in order to ensure reliable and consistent access to the sharable resources.

The concept according to at least one embodiment of the invention is by no means restricted to accesses or resources of a specific type, which means that the concept can be applied to the most disparate types of client-server systems, such as to mail servers, web servers, application servers, database servers, for example, together with the respective applications, programs and/or services. Equally, the concept according to at least one embodiment of the invention is essentially independent of the content of the respective functions or functionalities and can be applied to any client-server systems (such as, for example, medical engineering systems, systems in production and/or manufacturing control, reservation systems, planning systems, traffic safety systems, etc.).

Advantageously, the type of the respective access is not limited. According to an aspect of at least one embodiment of the invention, the access can therefore be a READ, WRITE, EXE, LIST and/or QUERY access. In this case the READ access and the WRITE access are a read access and correspondingly a write access to data records that are stored in the system. The EXE access is intended to execute an executable file and the LIST and QUERY accesses are used for listing and searching for data records in a file structure or in a database. An important advantage in this connection is also to be seen in the fact that the concept according to at least one embodiment of the invention is essentially independent of the implementation of the operating system and in particular of whether a random or sequential access to the memories or drives of the computer system is provided.

According to an advantageous development of at least one embodiment of the invention, the communication between the client and the server is based on an asynchronous protocol. This has the advantage that a data transmission is by no means required to be aligned with a predefined clock signal or a predefined clock pulse. In other words, the requests of the clients to the server and the respective responses of the servers to the clients can be performed at any instants in time. It is therefore advantageously not a condition for the implementation of at least one embodiment of the invention that the same clock frequencies must be negotiated for communication between the client and the server.

According to an aspect of at least one embodiment of the invention, the exclusive lock is always allocated at the time of a first access or first attempted access to the resource. This has the advantage that each access or each access attempt by a client can also be serviced and processed as quickly as possible. Furthermore, the number of attempts to access resources that are not available is minimized.

A number of notifications or messages which are generated automatically according to an aspect of the invention are described below. This enables additional control options to be provided for the client and for the server.

According to another aspect of at least one embodiment of the invention it is provided that the server sends a NOTIFICATION message to the client to which the exclusive lock has been allocated in order to inform the client and/or a user of the client that the allocated exclusive lock will expire after a time interval which can be predetermined. This feature serves for providing the client with supplementary information. The client is thus able to control its processes in the time that is available to it (time of the exclusive lock).

According to a further aspect of at least one embodiment of the present invention the server sends an ALERT message to the client in order to notify the client if an exclusive lock on the respective resource has been allocated to another client. In this case the ALERT message is sent to the client to which the exclusive lock had once been allocated at a previous time instant, though said exclusive lock has already expired in the interim. This feature affords the advantage that a client to which an exclusive lock had once been allocated on account of an access to a resource will always be informed that another client would now like to access this data. The client is thus notified automatically of the risk or possibility that the data will be modified.

According to another aspect of at least one embodiment of the invention it is provided that the server allows a REGAIN for an exclusive lock on a resource for a client. This is to be the case in particular when an exclusive lock for the respective resource had been allocated to the respective client at an earlier time instant and the client now wishes to access the resource again. This has the advantage that repeated accesses by a client to the respective resource can be processed with a higher priority. Such access attempts which basically are to be performed for the first time then have a subordinate priority.

According to a further aspect of at least one embodiment of the invention it is provided that the server sends an UPDATE to the client in respect of the resource. The UPDATE is sent in response to a REGAIN or a REGAIN request of the client for the same resource, the UPDATE including all changes that have been performed in a time period between the expiration of the preceding exclusive lock and the allocation of the subsequent exclusive lock on the resource for the client.

Accordingly a mechanism is advantageously created by which all changes between two succeeding accesses of in each case one client to in each case one resource can be easily registered.

According to another aspect of at least one embodiment of the invention the client sends a RELEASE for the resource to the server if no change to the resource is to be made or no write access to the resource is to be executed on the part of the client so that the server will thereupon release the exclusive lock for the client in respect of the resource. In this way it can advantageously be ensured that unnecessary exclusive locks are released or terminated at the earliest possible time.

According to a further aspect of at least one embodiment it is provided that the predeterminable time interval can be predetermined automatically as a function of the type of resource, the type of access and/or other parameters and optionally also provided to the client as supplementary information. This results in the advantage that the client is supported with further meta information in respect of its access, which information is provided to it automatically.

The term "type of resource" in this context means the different aforementioned resource types, such as data memories/storage media, software and/or hardware components or all types of different operating devices/modules of a computer-based system, as well as electronic representations of physical instances (e.g. in a reservation system).

"Type of access" in this connection means the different access categories, such as e.g. write, read access or the like. Further parameters can also be drawn upon here, depending on field of application and implementation. Time aspects, for example, can also be taken into account in these parameters, such that specific resources are to be accessible in predetermined time intervals or that specific selection criteria are provided here so that client classes and resource classes are defined, wherein predefinable assignments between a client class and a resource class are determined. This has the advantage that specific resources can be assigned for example with a higher priority to specific groups of clients (this is advantageous for example in the case of reservation systems in which specific classes are defined, e.g. first class, business class, etc.).

Further problem solutions exist in a system for controlling accesses to sharable resources in a distributed client-server system in parallel operation according to the accompanying independent claim. In this case a registration module and an allocation module can be embodied in the same higher-ranking computer-based entity. It is also possible to integrate the two modules into one module which then performs both functionalities. In an alternative embodiment variant of the invention the registration module and the allocation module can also belong to different computer-based instances.

A further problem solution is to be seen in the computer program product, wherein the computer is induced to perform the above-described method according to at least one embodiment of the invention and its program code is executed by way of a processor.

An alternative problem solution provides a storage medium which is intended for storing the above-described computer-implemented method and which can be read by a computer.

It is furthermore possible for individual sections of the above-described method or of the associated system (e.g. the registration module and the access module) to be implementable in each case in a separate salable unit and the remaining components in another salable unit—as a distributed system, as it were. System-level control of accesses to operating devices/modules can be achieved by way of the method according to at least one embodiment of the invention and in particular, by way of the access module.

BRIEF DESCRIPTION OF THE DRAWINGS

In the following detailed description of the figures, example embodiments, which are not to be understood as limiting, are discussed together with their features and further advantages with reference to the drawing, in which.

DETAILED DESCRIPTION OF THE EXAMPLE EMBODIMENTS

A basic principle of an embodiment of the present invention will be explained in more detail below in connection with FIG. 1.

Figure 1:
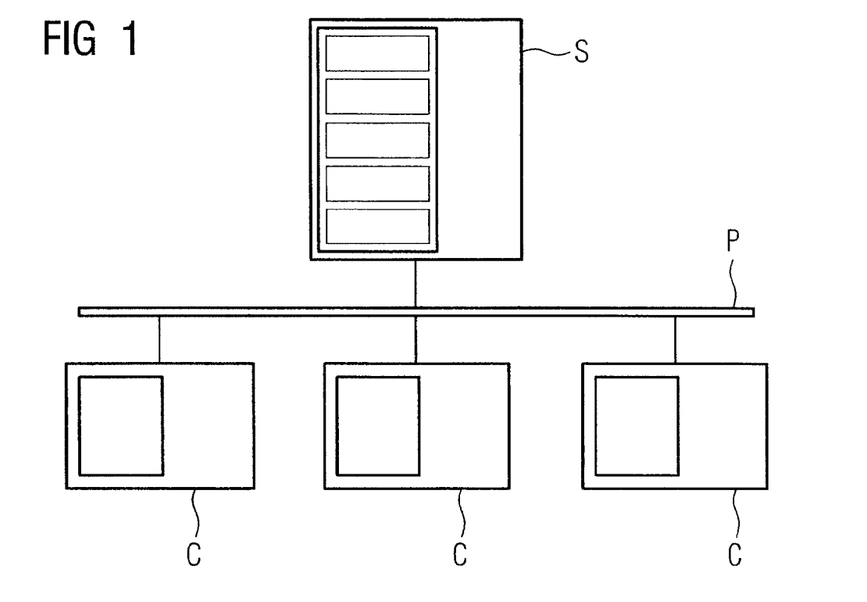
FIG. 1 shows a basic structure of a distributed client-server system in which a client communicates with a server via an asynchronous protocol.

As shown in FIG. 1, a server S communicates with a plurality of clients C, the communication being implemented by way of an asynchronous protocol P. The data records to be managed in the process are represented in the figures (and in particular also in FIG. 1) as rectangular fields.

The clients are basically identified in the figures by the reference signs C. Where a distinction is to be made between the respective clients, they are indexed with the reference signs C1, C2, C3 . . . Cn. The clients C can be hardware or software components which have the same or a different structure. For example, the clients C can be embodied by way of individual workstations, by way of a plurality of mobile devices, by way of individual components of information technology devices, etc. The server S services the requests of the clients and if necessary can send a result of the request back to the client C. The server S can itself act in turn as a client by submitting jobs to another server S.

The clients C compete for system resources, operating devices/modules or opportunities to access data records. As soon as it is permitted for a plurality of clients C to access a system resource (referred to in the following simply as "resource"), it must be ensured that consistent data is to be expected at all times within the information technology system. In particular where the individual resources are mutually dependent on one another, a deadlock must also be reliably ruled out.

The clients C can be individual jobs or tasks wanting to access operating devices/modules or a resource. In this case the jobs or tasks may also want to access the same resource (i.e. are in contention). The server S is a computer-based instance which essentially responds to the requests of the clients C. Generally it comprises a plurality of resources or operating devices/modules which can be accessed by the clients C. Many concepts for allocating resources are known in the prior art. Known in particular are specific scheduling and allocation rules so that consistent data processing can be ensured at any instant in time even in the case of contending accesses.

In a preferred embodiment variant the resources are data records or files which can be accessed by a plurality of clients C. In this case different types of access are possible in principle (write access, read access, execute access, etc.). Because a read access by definition does not modify the data, a plurality of clients C can also access the same file or the same data records simultaneously without causing consistency problems. However, if an access is of such type that it modifies the data records or the file (e.g. write access), it must be ensured that other likewise accessing clients C work with the "right" data records.

In a further example embodiment variant the resources are electronic representations of logical and/or physical resources. By physical resources are to be understood not just the usual physical operating devices/modules of a computer (memory/storage space, I/O ports, external devices such as printers, etc.) but also bookable entities, such as hotel rooms, sections of track in the case of a traffic planning tool, or seats in a reservation system (theater tickets, airplane seats, bus seats, etc.). The electronic representation in this case refers to an object of the computer system which is biuniquely associated with the physical resource.

According to an example embodiment variant of the present invention the communication protocol is an asynchronous protocol, such that the requests of the clients C to the server S are not constrained into a fixed time scheme, but are issued at arbitrary instants in time. The response of the server to a request by a client is likewise sent at arbitrary instants in time. Normally the response is forwarded as soon as possible to the requesting client C. A special advantage of the invention is therefore to be seen in the fact that the concept according to an example embodiment of the invention can be used in particular for web-based applications and internet applications which are essentially based on an asynchronous communication scheme.

The "many early locks mechanism" known in the prior art aims to set locks at the earliest possible stage. A disadvantage here is that in some cases locks are set unnecessarily. This will be the case, for example, when a client C, before performing a WRITE access or an EXE access, first requests a list of all the data records (for example by way of a LIST access, a search request or a directory command); this will then be interpreted as a READ and a lock will be set already.

In the second "lock little-lock late mechanism" known in the prior art it can disadvantageously happen that a client C cannot execute its request. This is the case, for example, when the "lock little-lock late mechanism" is used for an airplane seat reservation system. If a first client C1 wants to obtain an overview of seat occupation for the flight specified by it, one or more seats will appear as bookable (e.g. green). If the client C1 waits a certain period of time, it is theoretically possible that another client C2 would also like to reserve one of said bookable seats marked as green. If, however, the first client C1 then wishes to book precisely said seat that has just been reserved by C2, this is of course no longer available and the booking (or access) cannot be carried out because the first client C1 has been "overtaken" by an unexpected booking by another client C2. The lock little-lock late strategy accordingly displays fewer locks for the clients than are actually present. This allocation strategy is therefore useful in particular when absolutely all of the resources (like the seats in this case) are to be booked.

An example embodiment of the invention provides a solution for the two aforementioned disadvantages in that locks are likewise set, but these are automatically assigned a "time limit" or lifespan. This results in deadlocks which are, however, resolved automatically.

Figure 2:
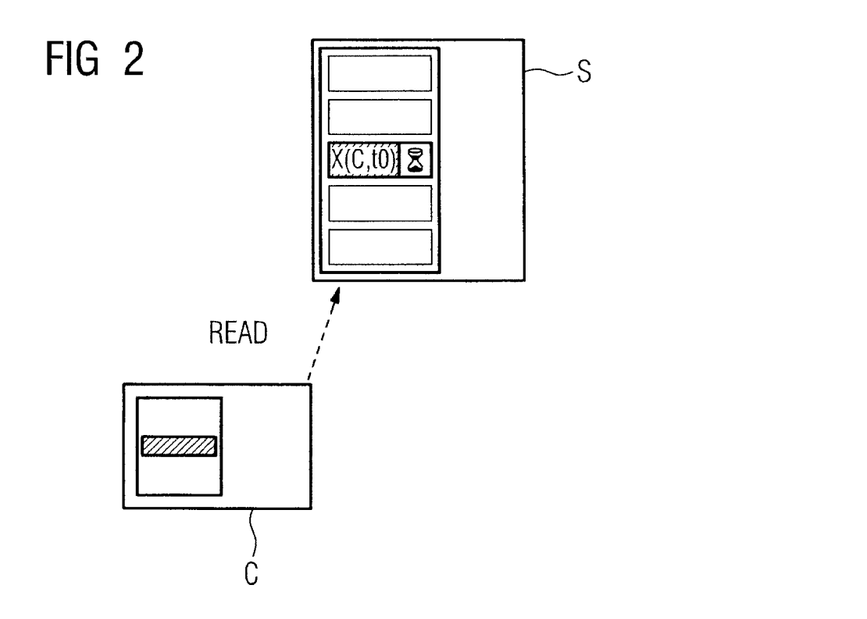
FIG. 2 shows a schematic representation according to an example embodiment variant of the invention, wherein a client accesses data records of a server.

This is illustrated in greater detail in connection with FIG. 2. In FIG. 2, the client C accesses a data record (represented by X(C,t0) in FIG. 2) of the server S by way of a READ access. Even for this READ access of the client C, a temporary exclusive lock is also allocated to the client C for the resource, such that it receives a copy of the data which it can read, the exclusive lock expiring again automatically after a predetermined time has elapsed. During the allocated lock the respective client can manage and control the resource on its own, and consequently also modify the respective data records.

Usually it is provided that a lock is basically granted or allocated at the time of a first access or a first access attempt. The type of access involved is immaterial in this case. The lock is therefore allocated both for a READ access and for the other access types, such as WRITE access and EXE access, etc.

The lock is in particular an exclusive lock, so that a lock can essentially be allocated only if there is no other lock at the same time instant.

According to an example embodiment of the invention the lock is automatically allocated for a predeterminable period of time only. In other words, it therefore expires again automatically at the end of the predeterminable time period. Alternatively—as already mentioned above—other expiration conditions can also be provided here which are applied in addition or alternatively to the time-based expiration (e.g. event-driven).

Figure 3:
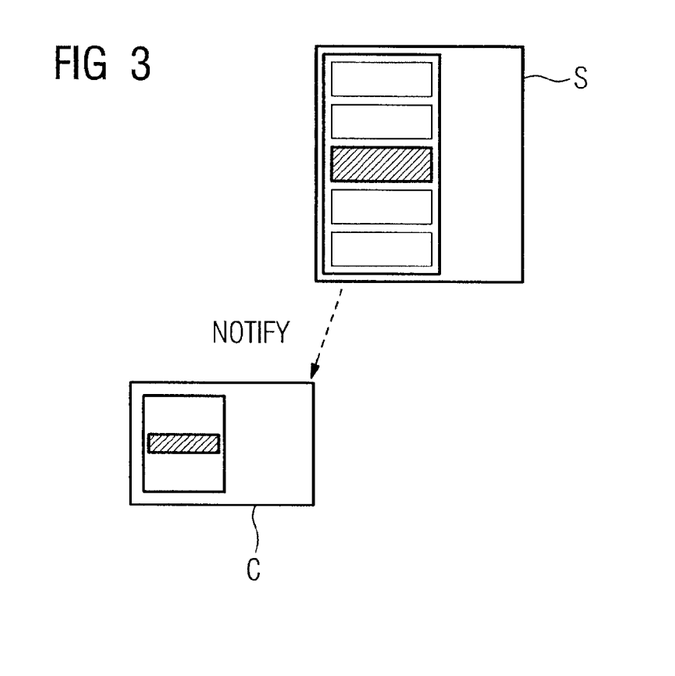
FIG. 3 shows a schematic representation of a NOTIFICATION message from the server to the client according to an example embodiment variant of the invention.

As shown in FIG. 3, provision is made in an example embodiment variant of the invention for the server S to send a NOTIFICATION message to the owner of the lock (in this case client C) flagging the expiration of its exclusive lock after the predetermined time interval elapses. The client application can thereupon inform the respective user about the expiration of his/her lock and/or can modify or abort the presentation and/or the processing of the data. This can be realized as a function of the data. In an advantageous embodiment variant it is provided that the data will always be presented against a green background while the exclusive lock is allocated, the background then changing to a different color once the lock has expired. Alternative possibilities provide other markers for the existence of a lock in this case. Alternatively to the highlighting in color, other flags or indicators can be set here accordingly, such as e.g. indicating the marking of an existing lock in the form of a separate pop-up window on the screen. Equally conceivable are other alternative embodiment variants which inform the user that at the present time the data record is blocked for current use by the user.

In another embodiment variant, the NOTIFICATION message of the server S to the client C additionally includes further meta information. The meta information comprises information relating to the lifetime (timeout) of the allocated exclusive lock. In this time it is for example possible for the client to execute an exclusive write access to the data of the respective file. In further advantageous embodiment variants, the meta information also includes additional information. This can consist for example of information concerning other exclusive locks that have been issued to other clients or information concerning the time elapsed thus far for the allocated lock, etc.

Figure 4:
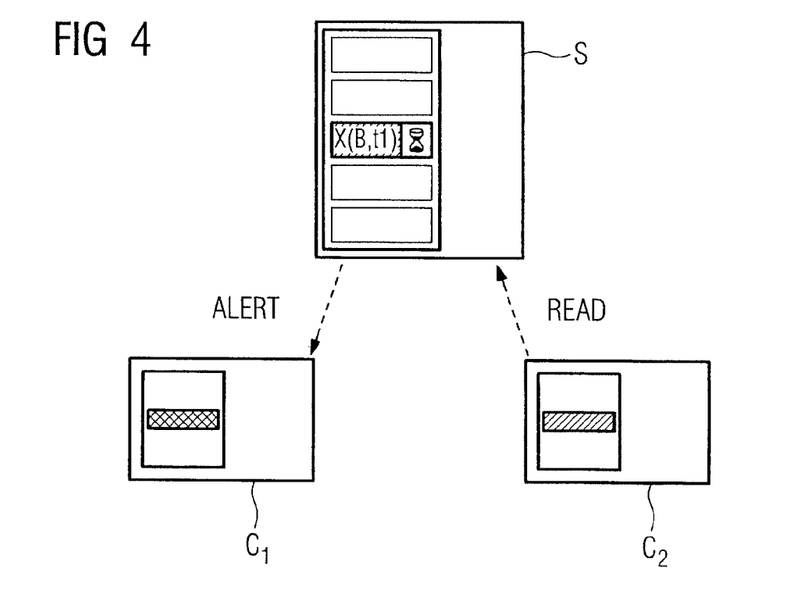
FIG. 4 shows a schematic representation according to an example embodiment variant of the invention, wherein the client is notified by way of an ALERT message.

A further advantageous embodiment variant of the invention is described below in connection with FIG. 4. This provides that the server S sends an ALERT message to the client C that is the owner of the exclusive lock. This ALERT message informs the client C about the allocation of an exclusive lock to another client (designated by C2 in FIG. 4) for a data record D for which the client C1 had been allocated an exclusive lock at an earlier time instant, which lock has expired in the interim. In this way the client application C1 is alerted to the fact that the possibility or risk exists that the data record read or processed by it is now being or has been processed and possibly modified by another client C2.

One possibility of presenting this in an instantly recognizable manner for the user on the device C1 is to highlight the blocked data record (as already described above, e.g. against a different background, e.g. using a color coding scheme). Alternatively or in addition it is also possible once again to display the data record specially highlighted once the exclusive lock for the respective data record allocated to the other client C2 no longer exists or has expired. The data record could then be highlighted for example in a different color in order to indicate to or inform the first client C1 that the exclusive lock for the other client C2 has now expired. Thus, the first client C1, to which an exclusive lock for the respective data on the server S had once been allocated, will always receive a message if the possibility exists that said data record can be overwritten by another client (in this case by client C2).

Figure 5:
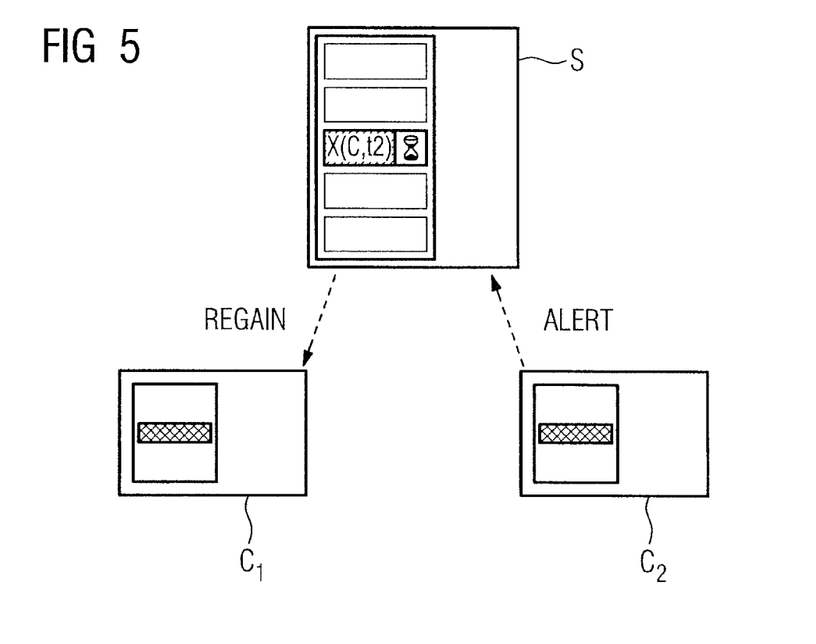
FIG. 5 shows a schematic representation according to an example embodiment variant of the invention, wherein the client receives a REGAIN after having been notified by way of an ALERT message.

In connection with FIG. 5, an embodiment variant of the invention is described in which the server S receives a REGAIN message from the client C1 by which the client C1 indicates that it would once again like to receive an exclusive lock on the respective data record. This is the case in particular when the client C1 wishes to perform an access or attempt an access to the respective data record. Normally a REGAIN is only possible provided that at this time instant there is no active exclusive lock which has been allocated to another client Ci.

According to one embodiment variant it is, moreover, entirely possible for the client C1 to send a REGAIN request to the server S. However, an allocation of the REGAIN will only be permitted provided no exclusive lock is currently allocated. Depending on embodiment variant it is possible for the server S to allow a REGAIN request and/or a REGAIN allocation only if a predeterminable time interval has elapsed. This is useful for example in order to ensure a specific level of utilization of server capacity and guarantee a specific degree of synchronicity.

According to an example embodiment variant, allocating the REGAIN for client C1 will only be possible after the exclusive lock of client C2 has already expired, as is intended to be indicated in FIG. 5. Optionally, the client C2 can then be informed about the REGAIN of the client C1 by way of an ALERT message. It should be pointed out in this connection that the REGAIN option or the allocation of a REGAIN does not require a NOTIFICATION or an ALERT to be sent. In other words, notifying the clients (by way of NOTIFICATION and ALERT) is only performed as an optional function. This does not constitute any security risk because the server S will automatically detect whether the client C wishes to modify the corresponding data records or execute a write access to the data records, but has no entitlement whatsoever to do so because its exclusive lock has already expired. In this case the server S will automatically prevent any possibility of the data records being modified. This prevention also takes place without a NOTIFICATION or an ALERT message.

Figure 6:
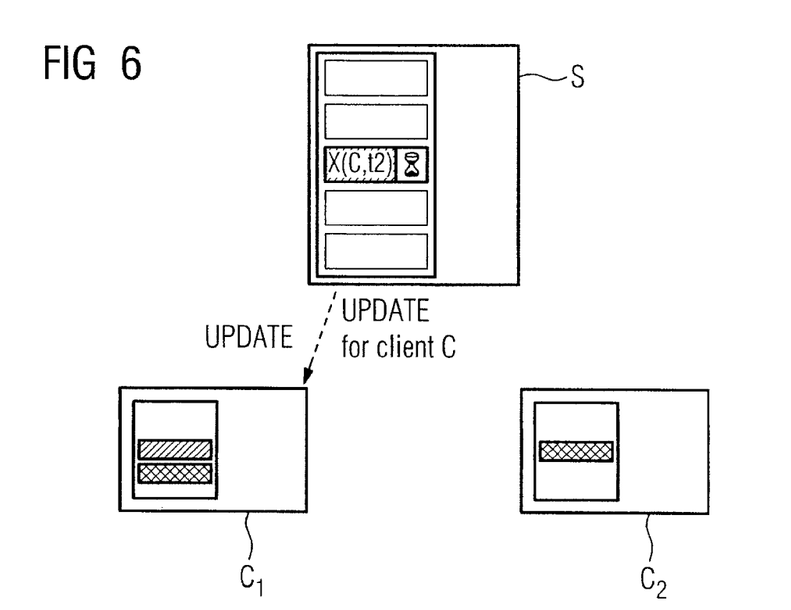
FIG. 6 shows a schematic representation according to an example embodiment variant of the invention, wherein the server sends an UPDATE to the client in response to a REGAIN.

A further embodiment variant shall be described in connection with FIG. 6. In this case the server S sends an UPDATE or an UPDATE message for the data D to the client C in response to a REGAIN request of the client C for access to the respective data records. The UPDATE message includes all changes to the data records that have been made between the expiration of the first lock for the client and the reallocation of the second lock to the same client (by way of the REGAIN). In other words, the client C receives all modifications (a delta) in respect of the data records. The respective client application can thereupon synchronize said modifications locally. For example, a MERGE or a consolidation or a highlighting of the modified data records can be performed locally on the client C. In a simpler alternative implementation it is possible for the server S merely to send the currently valid data records to the client C in response to a REGAIN request by the client C. The client C can then synchronize the delta or the modifications locally between the locally available data records and the central version of the data records. In a further embodiment variant it is possible for the subsequent lock (that has been allocated in response to a REGAIN request) to include meta information in addition, relating to the lifetime of the lock for example. The meta information can be included in the UPDATE message that is sent by the server S to the client C.

The embodiment variants described thus far are directed toward the server taking responsibility for monitoring and controlling all access attempts and accesses on the part of the clients. It additionally takes on the task of servicing the respective clients with further messages and meta information arising in connection with the access control function (UPDATE, NOTIFICATION, ALERT, etc.). In alternative embodiment variants it is, however, possible for the aforementioned functionalities (monitoring, sending messages) also to be handled by separate instances or modules and not necessarily to be handled directly and immediately by the server S. This enables the system as a whole to be organized and managed with greater flexibility.

According to another embodiment variant which is not shown in the figures, it is possible for a notification to be initiated by the client C and actively sent by the client C to the server S.

For example, a RELEASE for a data record of a client C can be sent to the server S if the client C can ensure that it will not make any modifications or execute write accesses to the respective data records. In response the server S can then (prematurely) remove the exclusive lock in respect of the respective client C from the data record. This has the advantage that the exclusive lock is only allocated for as long as is absolutely necessary.

It should be pointed out that it is basically possible to provide different time intervals or lifetimes for allocation of the exclusive locks. Furthermore, the lifetime can basically be dependent on the type of resource (data records that are requested very frequently, for example, usually have a shorter lifetime than data records that are requested very infrequently; similarly, operating devices/modules that are used very frequently, such as for example a printer or a scanner, etc., also tend to have shorter useful lives than operating devices/modules that are employed very rarely, for example a particular specialized application). Moreover, the time intervals or lifetimes can also be implemented as a function of the access attempt by the client C. Thus, for example, it can be preset by default that a READ access has longer allocation time intervals than a (critical) WRITE access. It is furthermore possible to provide the additional information in respect of the allocated length of time of the exclusive lock (the lock's lifetime) to the client as meta information. The meta information can be made available for example in response to an access of the client C, as well as in the form of supplementary information in the case of an UPDATE message.

A special embodiment variant relates to what are termed countable resources. These are to be understood as resources which can be described by way of a decrementable number, such as e.g. the number of hotel rooms that can be booked, the number of seats in an airplane, etc. Basically, the resources can also be classified into specific classes (in reservation systems: e.g. first class, business class, etc.). In this embodiment variant the lock according to the invention can also be allocated as a function of the resource class. In other words, an access can be attempted for example only in respect of a selected category of resources (e.g. only for seats in first class). If the resources are countable resources, a counter can be implemented which is to indicate allocated locks on the resources.

As soon as a further exclusive lock on the resource has been allocated, the counter is incremented. If the exclusive lock has expired (e.g. due to a timeout after the time interval has elapsed or due to a ROLLBACK or due to a RELEASE), the counter is decremented. In this embodiment variant, only the current counter reading is sent to the client C in response to an ALERT or an UPDATE. A REGAIN can then be easily implemented by decrementation of the counter. In this embodiment variant, a COMMIT can be provided in addition. This command signifies that the exclusive lock has been removed from the respective data record in respect of the client C and that the counter is to remain unchanged.

A further embodiment variant relates to finely classified or finely granulated resources. The finely granulated resources are resources of a type in which every element of the resource (e.g. an individual seat) is biuniquely identifiable. Seats in a train may serve as an example here, whereby when a seat booking is made the respective reserved seat is allocated on a one-to-one basis to a specific passenger. In contrast thereto, only classes can be formed in the case of the decrementable resources. The elements within the classes are not biuniquely identifiable and interchangeable. In the case of the finely granulated resources it is, however, possible according to an embodiment variant of the invention to provide each individual element of a resource with an exclusive lock. Alternatively thereto it is possible to provide individual or all elements of the same class of resources with an exclusive lock.

In an example embodiment variant it is provided that the time interval is predeterminable and will then automatically be taken into account when the exclusive lock is allocated to the client. In this embodiment variant the client C has no influence over the time period for which the exclusive lock is allocated. Alternatively thereto, in another embodiment variant, it is possible for the client C to send, already at the time of a first access to the resource or of a first access attempt, an additional request to the server S or to a separate control module in which it defines a "preferred time interval". The preferred time interval denotes the minimum timeframe planned by the client C for the execution of its planned action to access the resource. When allocating the exclusive lock to the respective client C, the server S or separate control instance then, if possible, takes into account said preferred time period. This is intended to make sure that the client C can be assured of a minimum level of efficiency and will not be interrupted unnecessarily during the execution of its access.

Basically it is provided that only one exclusive lock per resource will be allocated in total for all sessions. As soon as the server S receives a first access or a first access request from a client C, an exclusive lock is automatically allocated to said client C if no exclusive lock currently exists for the resource. The same applies to a REGAIN or to a REGAIN request. A second access attempt by another client or a REGAIN request of another client would automatically fail if an exclusive lock in respect of the resource has already been allocated. Automatic prioritization of accesses is achieved in this way. The prioritization is carried out according to the time of arrival of the access. In other words, the strategy "first come—first served" applies here.

The concept according to an example embodiment of the invention can in principle be applied to different operating systems and in different fields of technology. However, a primary application relates to the control of accesses to technical operating devices/modules, as well as to the control of accesses to medical engineering equipment and to other physical modules. Equally, accesses by clients C can be performed via the internet. In this connection it proves very advantageous that the clients can in principle be connected via the internet and that no supplementary measures are necessary for access control. This is because according to an example embodiment of the invention lifetime settings are provided for the lock, which means that no additional mechanisms need to be invoked even in the event of an interruption to the internet connection.

A further advantage is also to be seen in the fact that the mechanism is essentially independent of a specific communication protocol. The access control functionality according to an example embodiment of the invention can be used for any protocols and for any systems.

In conclusion it should be pointed out that the description of the invention and the example embodiments are by no means to be understood as limiting with regard to a specific physical realization of the invention. In particular it will be obvious to those skilled in the art that the invention can be implemented partially or completely in software and/or hardware and/or in a distributed manner encompassing a plurality of physical products—in this case in particular also computer program products.

The invention claimed is:

1. A computer-implemented method for controlling an access to sharable resources in a distributed client-server system in parallel operation, wherein a control function is performed centrally for a plurality of clients connected to the distributed client-server system, the control function comprising:
registering an access request from an accessing one of the plurality of clients that is requesting access to one of the sharable resources;
determining a time interval for the accessed one of the sharable resource to be blocked from access by other of the plurality of clients based on a type of the one of the sharable resources and a type of the access request, where the type of the access request is one of requests to READ, WRITE, EXE, LIST and QUERY the sharable resource;
allocating an exclusive lock, for the accessed one of the sharable resources, to the accessing client, the exclusive lock blocking access by other of the plurality of clients to the accessed one of the sharable resources and the exclusive lock being allocated for the time interval and then automatically expiring after the time interval elapses;
providing the accessing client with meta information indicating the time interval for which the accessing client is assigned the exclusive lock;
allowing one of the plurality of clients to re-obtain an exclusive lock on one of the sharable resources if the requested sharable resource had formerly been blocked for the one of the plurality of clients by way of an exclusive lock and if the one of the plurality of clients wishes to access the requested sharable resource by way of a REGAIN request; and
sending an UPDATE to the client in respect of the sharable resource in response to the REGAIN request for the same sharable resource, the UPDATE including changes made in a time period between expiration of a previous exclusive lock and the allocation of a subsequent exclusive lock for the one of the plurality of clients in respect of the requested sharable resource.

2. The method of claim 1, wherein the sharable resources include at least one of external or internal operating devices/modules, data memories/storage media, electronic objects and/or communication devices/modules, and electronic representations of logical and/or physical resources.

3. The method of claim 1, wherein communication between the plurality of clients and the server is based on an asynchronous protocol.

4. The method of claim 1, wherein the exclusive lock is allocated to the resource at a time of a first access or at a time of a first access attempt.

5. The method of claim 1, wherein the server sends a NOTIFICATION message to the client to which the exclusive lock has been allocated in order to inform the client that the exclusive lock will expire after the time interval elapses.

6. The method of claim 1, wherein the server sends an ALERT message to the client to inform the client, to which the exclusive lock had once been allocated at a previous time instant but which is now expired, if an exclusive lock on the accessed one of the sharable resources has been allocated to another of the plurality of clients.

7. The method of claim 1, wherein the client sends a RELEASE for the sharable resource to the server if no changes to the sharable resource are to be made or no write access to the sharable resource is to be executed on the part of the client, the server thereupon revoking the exclusive lock for the client in respect of the sharable resource.

8. The method of claim 1, wherein the determined time interval is also supplied to the accessing client as supplementary information.

9. A system for controlling an access to sharable resources in a distributed client-server system in parallel operation, the controlling being performed centrally for a plurality of clients connected to the system, the system comprising: a processor and a memory having machine readable code that, when executed by the processor, configures the processor as:
a registration module, configured to register an access request from at least an accessing one of the plurality of clients that is requesting access to one of the sharable resources; and
an allocation module, configured to,
determine a time interval for the accessed one of the sharable resource to be blocked from access by other of the plurality of clients based on a type of the one of the sharable resources and a type of the access request, where the type of the access request is one of requests to READ, WRITE, EXE, LIST and QUERY the sharable resource,
allocate an exclusive lock for the accessed one of one of the sharable resources to the accessing client, the exclusive lock blocking access by other of the plurality of clients to the accessed one of one of the sharable resources for the time interval and then automatically expiring after the time interval elapses, provide the accessing client with meta information indicating the time interval for which the accessing client is assigned the exclusive lock, allow one of the plurality of clients to re-obtain an exclusive lock on one of the sharable resources if the requested sharable resource had formerly been blocked for the one of the plurality of clients by way of an exclusive lock and if the one of the plurality of clients wishes to access the requested sharable resource by way of a REGAIN request, and send an UPDATE to the client in respect of the sharable resource in response to the REGAIN request for the same sharable resource, the UPDATE including changes made in a time period between expiration of a previous exclusive lock and the allocation of a subsequent exclusive lock for the one of the plurality of clients in respect of the requested sharable resource.

10. A non-transitory computer readable medium including program segments for, when executed on a computer device, causing the computer device to implement the method of claim 1.

* * * * *